US012179339B2

(12) United States Patent
Matsumoto et al.

(10) Patent No.: US 12,179,339 B2
(45) Date of Patent: Dec. 31, 2024

(54) TOOL REPLACING DEVICE

(71) Applicant: NITTA CORPORATION, Osaka (JP)

(72) Inventors: Ryosuke Matsumoto, Nabari (JP); Hiroki Kikuchi, Nabari (JP)

(73) Assignee: NITTA CORPORATION, Osaka (JP)

( * ) Notice: Subject to any disclaimer, the term of this patent is extended or adjusted under 35 U.S.C. 154(b) by 469 days.

(21) Appl. No.: 17/777,615

(22) PCT Filed: Oct. 30, 2020

(86) PCT No.: PCT/JP2020/040820
§ 371 (c)(1),
(2) Date: May 17, 2022

(87) PCT Pub. No.: WO2021/106491
PCT Pub. Date: Jun. 3, 2021

(65) Prior Publication Data
US 2022/0410407 A1    Dec. 29, 2022

(30) Foreign Application Priority Data

Nov. 28, 2019  (JP) ................................ 2019-215371

(51) Int. Cl.
*B25J 15/04* (2006.01)
(52) U.S. Cl.
CPC ................. *B25J 15/0408* (2013.01)
(58) Field of Classification Search
CPC ........ B25J 15/04; B25J 15/0408; B25J 19/00; G08C 19/00; H02J 17/00; B23Q 3/12
See application file for complete search history.

(56) References Cited

U.S. PATENT DOCUMENTS 5,294,209 A    3/1994  Naka et al.
6,375,378 B1 *  4/2002  Kitaura .................... B25J 15/04
                                              403/322.2

(Continued)

FOREIGN PATENT DOCUMENTS

JP    H04-101796    4/1992
JP    H05-192886    8/1993

(Continued)

OTHER PUBLICATIONS

International Search Report dated Dec. 22, 2020 in International Application No. PCT/JP2020/040820.

(Continued)

*Primary Examiner* — Daniel J Wiley
(74) *Attorney, Agent, or Firm* — Wentsler LLC

(57) ABSTRACT

A tool exchange device includes a first coupling member attached to one of a body side of an apparatus and a tool side and having a first coupling surface, and a second coupling member attached to the other of the body side and the tool side and having a second coupling surface capable of being in contact with the first coupling surface, in which the first coupling member includes, on the first coupling surface, a first pin, a second pin, and an auxiliary projection, the second coupling member includes, on the second coupling surface, a first hole, a second hole, and an auxiliary hole, a first gap is provided each between the first pin and the first hole and between the second pin and the second hole, a second gap is provided between the auxiliary projection and the auxiliary hole, and the second gap is larger than the first gap.

6 Claims, 9 Drawing Sheets

(56) References Cited

U.S. PATENT DOCUMENTS

| | | | | |
|---|---|---|---|---|
| 6,752,037 | B1 * | 6/2004 | Miyazawa | B25J 15/04 |
| | | | | 74/490.01 |
| 10,076,844 | B2 * | 9/2018 | Rizk | B25J 15/0491 |
| 11,235,475 | B2 * | 2/2022 | Kayama | B25J 15/0475 |
| 11,318,624 | B2 * | 5/2022 | Correll | B25J 19/0041 |
| 11,794,359 | B1 * | 10/2023 | Sykes | B25J 9/162 |
| 11,926,043 | B2 * | 3/2024 | Maurer | B25J 15/028 |
| 2011/0256995 | A1 | 10/2011 | Takazakura et al. | |
| 2019/0126494 | A1 | 5/2019 | Matsumoto | |

FOREIGN PATENT DOCUMENTS

| | | |
|---|---|---|
| JP | H07246584 | 9/1995 |
| JP | 2010-036286 | 2/2010 |
| JP | 2012-250327 | 12/2012 |
| JP | 2018-118333 | 8/2018 |
| WO | 2017/187979 | 11/2017 |

OTHER PUBLICATIONS

Office action dated Jun. 28, 2023 in counterpart application No. 202080081080.1 in China (machine translation of Office action text provided).

Biao, "Modern CNC machining technology and operation technology", Apr. 2016, National Defense Industry Press, p. 91-92 (machine translation of Introduction and Table of Contents provided).

\* cited by examiner

TOOL REPLACING DEVICE

TECHNICAL FIELD

The present invention relates to a tool exchange device.

BACKGROUND ART

As tool exchange devices to be employed for various apparatuses, for example, industrial robots, devices including a first coupling member attached to the robot body side and a second coupling member attached to the tool side are disclosed (for example, PTL 1). In these tool exchange devices, upon a cam of the projection portion being engaging with an engaging member on an inner surface of a coupling hole in a state where a projection portion provided on a coupling surface of the first coupling member is inserted in a coupling hole provided in a coupling surface of the second coupling member and the coupling surfaces are in contact with each other, the first coupling member and the second coupling member are coupled. Also, disengagement between the cam and the engaging member enables decoupling between the first coupling member and the second coupling member. In this manner, a tool exchange device enables change of tools attached to an industrial robot. The industrial robot performs a desired operation by reproducing an operation on the basis of a program created by performing teaching for recording the operation in advance.

Depending on the purpose of use of the robot or the type of the tool, it is necessary to transmit and receive a control signal and the like between a circuit such as a control device provided in the robot body and a circuit incorporated in the tool. When the tool exchange device is used, the robot body and the tool are coupled and decoupled, and thus it is necessary to connect and disconnect signal wires between the circuits accordingly. Signal relay devices that perform such connection and disconnection of signal wires are known. A signal relay device includes signal modules attached respectively to a first coupling member and a second coupling member. The signal modules include respective connectors that, upon the first coupling member and the second coupling member being coupled, cause respective terminals to come into contact with each other and thereby electrically connected, and upon the first coupling member and the second coupling member being decoupled, cancel the contact between the terminals.

The tool exchange device of above-described PTL 1 positions the first coupling member and the second coupling member by inserting two tapered pins provided on the coupling surface of the first coupling member into two holes provided in the coupling surface of the second coupling member.

PTL 2 discloses a tool exchange device including three tapered pins provided on the coupling surface of the first coupling member and three holes provided on the coupling surface of the second coupling member.

CITATION LIST

Patent Literature

PTL 1: JP H4-101796 A
PTL 2: JP 2010-36286 A

SUMMARY OF THE INVENTION

Technical Problem

Depending on the operation of the industrial robot, the weight of the tool, and the position of the center of gravity of the tool, a load (torsional torque) is generated in the tool exchange device in a rotation direction about an axis intersecting the coupling surface. The tool exchange device disclosed in PTL 1 is structured to position the first coupling member and the second coupling member by inserting two tapered pins provided on the coupling surface of the first coupling member into two holes provided in the coupling surface of the second coupling member, and to prevent a positional deviation in the rotation direction caused by the torsional torque described above. In order to smoothly couple and decouple the robot body and the tool, a gap is provided between the two tapered pins and the two holes.

When the torsional torque is applied to the tool exchange device during operation of the industrial robot, a positional deviation in the rotation direction occurs between the coupling surfaces of the first coupling member and the second coupling member by the amount of the gap between the tapered pin and the hole. When the torsional torque further increases, the first coupling member and the second coupling member are elastically deformed, and the positional deviation in the rotation direction becomes larger. If a relative displacement angle, which is a displacement of a central angle of the second coupling member with respect to the first coupling member before and after the occurrence of the positional deviation in the rotation direction, becomes too large, a positional deviation between the terminals in the connector also becomes large, and there is a problem that communication abnormality occurs.

As the weight of the tool increases, the torsional torque also increases and the relative displacement angle also increases, and therefore, it is necessary to set resistance (torsional torque resistance) to the torsional torque of the tool exchange device according to a portable weight of the robot. As in the tool exchange device described in PTL 2, the number of tapered pins is changed from two in the related art to three, and the stress acting on each tapered pin is reduced, so that the torsional torque resistance can be improved.

However, when the number of tapered pins is three, the number of positions to be aligned increases as compared with the case of two tapered pins. Therefore, when the tapered pins are inserted in the holes in accordance with the coupling operation of the first coupling member and the second coupling member, it is necessary to more precisely control the relative positions between the first coupling member and the second coupling member, and thus there is a problem that teaching becomes difficult and operability is deteriorated.

An object of the present invention is to provide a tool exchange device that can improve torsional torque resistance while suppressing deterioration in operability of teaching.

Solution to Problem

A tool exchange device according to the present invention includes a first coupling member attached to one of a body side of an apparatus and a tool side and having a first coupling surface, and a second coupling member attached to the other of the body side and the tool side and having a second coupling surface capable of being in contact with the first coupling surface, in which the first coupling member includes, on the first coupling surface, a first pin, a second pin, and an auxiliary projection, the second coupling member includes, on the second coupling surface, a first hole that allows the first pin to enter and exit, a second hole that allows the second pin to enter and exit, and an auxiliary hole that allows the auxiliary projection to enter and exit, a first gap in a direction parallel to the second coupling surface is provided each between the first pin and the first hole and between the second pin and the second hole, a second gap in a direction parallel to the second coupling surface is provided between the auxiliary projection and the auxiliary hole, and the second gap is larger than the first gap.

Advantageous Effects of the Invention

According to the present invention, torsional torque resistance can be improved by including the auxiliary projection. Further, although the auxiliary projection is provided, since the second gap is larger than the first gap, the auxiliary projection does not affect an operation of teaching, so that it is possible to suppress deterioration of the operability of the teaching.

DESCRIPTION OF EMBODIMENTS

Hereinafter, embodiments of the present invention will be described in detail with reference to the drawings.

1. First Embodiment (Overall Configuration)

Figure 1:
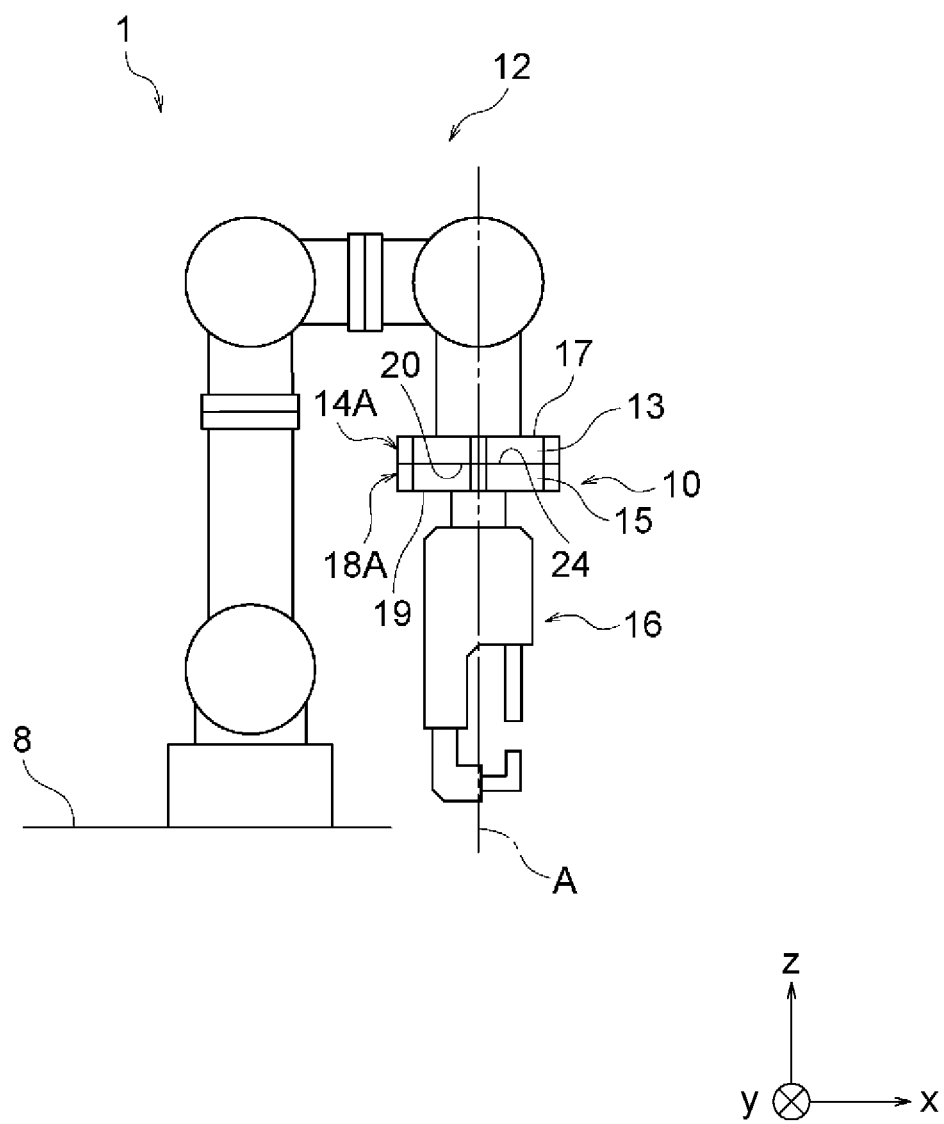
FIG. 1 A schematic view illustrating an industrial robot to which a tool exchange device according to a first embodiment is applied.

A tool exchange device 10 illustrated in FIG. 1 includes a first coupling member 14A fixed to a distal end of an arm 12 as a body of an industrial robot 1 as an apparatus, and a second coupling member 18A fixed to a tool 16. The first coupling member 14A and the second coupling member 18A have plate-shaped bodies 13 and 15 formed of metal such as aluminum and having a predetermined thickness. The body 13 of the first coupling member 14A has a first coupling surface 20, and the body 15 of the second coupling member 18A has a second coupling surface 24. The tool exchange device 10 of FIG. 1 indicates a posture in which the first coupling surface 20 of the first coupling member 14A and the second coupling surface 24 of the second coupling member 18A are coupled in a contact state. In FIG. 1, the tool exchange device 10 is installed on a base 8 parallel to the x-y plane, and holds the tool 16 in a direction in which an axis A intersecting the first coupling surface 20 and the second coupling surface 24 is parallel to a z axis. In the case of this figure, the axis A passes through the center of the tool exchange device 10 and is orthogonal to the first coupling surface 20 and the second coupling surface 24.

The first coupling member 14A is detachably fastened to the arm 12 by a bolt, which is not illustrated, on a first fixing surface 17 back-to-back with the first coupling surface 20. The second coupling member 18A is detachably fastened to the tool 16 by a bolt, which is not illustrated, on a second fixing surface 19 back-to-back with the second coupling surface 24. In this figure, a spot welding gun is illustrated as the tool 16, but a plurality of different tools 16 with the second coupling member 18A attached thereto are prepared on a mounting table, which is not illustrated. The arm 12 and the tool can be coupled and decoupled via the tool exchange device 10, and the tools 16 can be changed on the arm 12.

Figure 2A:
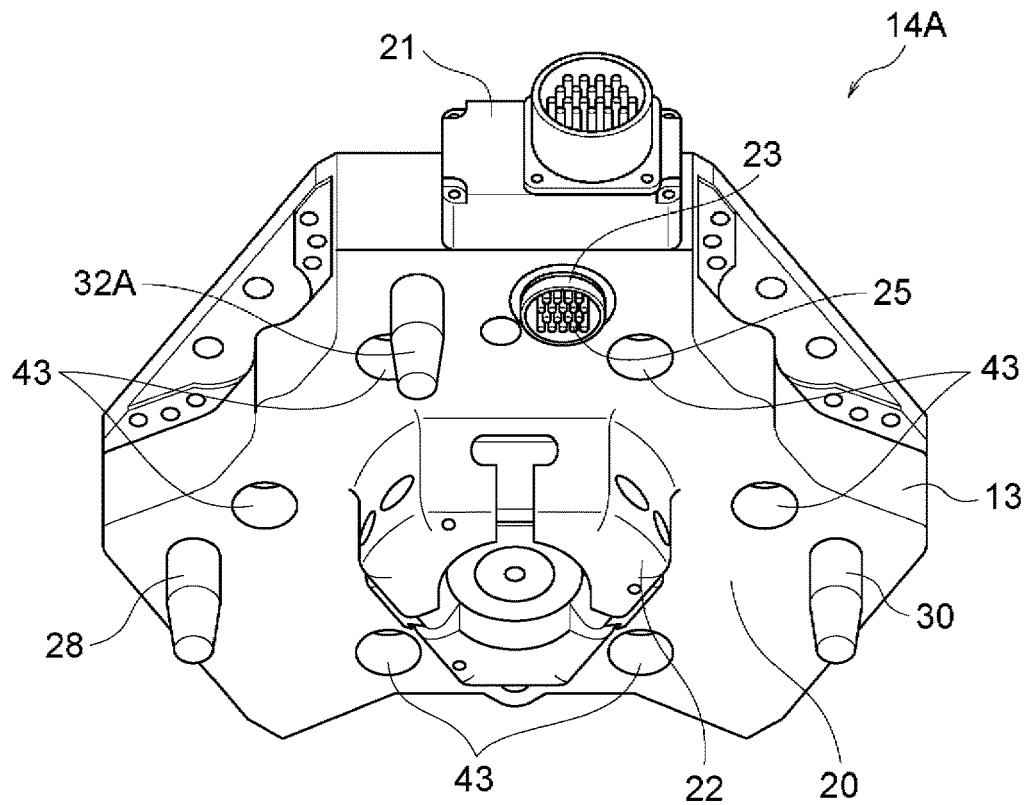
FIG. 2A A perspective view illustrating a first coupling member of the tool exchange device according to the first embodiment.

FIG. 2A is a perspective view illustrating the first coupling member 14A. The first coupling member 14A is provided with a projection portion 22 projecting from the first coupling surface 20 at the center of the body 13. The projection portion 22 has an engaging mechanism including a cam. In the first coupling member 14A, a first pin 28, a second pin 30, and an auxiliary pin 32A as an auxiliary projection are disposed around the projection portion 22. The first pin 28, the second pin 30, and the auxiliary pin 32A project from the first coupling surface 20.

The first coupling member 14A is provided with a plurality of (six in the case of FIG. 2A) through holes 43 into which bolts (not illustrated) for fixing are inserted at the distal end of the arm 12. In the first coupling member 14A, a first signal module 21 is provided on a side surface disposed between the first coupling surface 20 and the first fixing surface 17 of the body 13. The first signal module 21 includes a first connector 23 whose terminal 25 is exposed on the first coupling surface 20.

Figure 3:
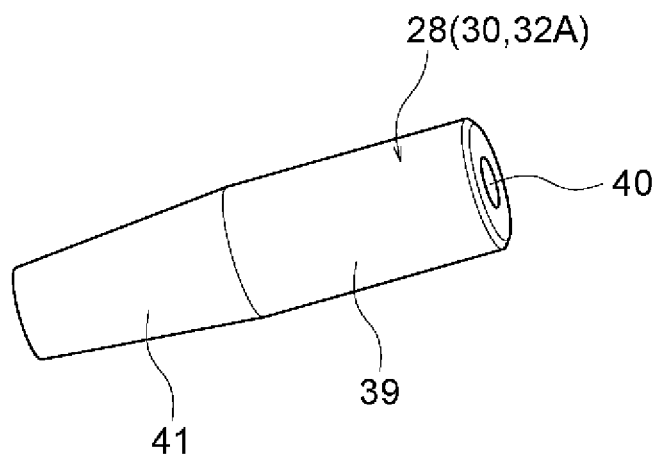
FIG. 3 A perspective view illustrating a first pin (a second pin and an auxiliary pin) according to the first embodiment.

The first pin 28, the second pin 30, and the auxiliary pin 32A according to the first embodiment have the same shape and length, and are made of high-strength metal, for example, steel. The first pin 28 will be described as a representative with reference to FIG. 3. As illustrated in FIG. 3, the first pin 28 is a tapered pin including a columnar portion 39 having a columnar shape and a tapered portion 41 having a truncated cone shape in which a base end is integrally provided at a distal end of the columnar portion 39 and a diameter decreases toward the distal end. An outer diameter of the columnar portion 39 and an outer diameter of the base end of the tapered portion 41 are the same. A female screw 40 is formed at a base end of the columnar portion 39. A diameter of the columnar portion 39 of the auxiliary pin 32A is smaller than diameters of the columnar portions 39 of the first pin 28 and the second pin 30.

The first pin 28, the second pin 30, and the auxiliary pin 32A are fixed to the body 13 by inserting the columnar portion 39 into a hole (not illustrated) provided in the body 13 of the first coupling member 14A from the first coupling surface 20 side and screwing a bolt (not illustrated) from the first fixing surface 17 into the female screw 40. The first pin 28, the second pin 30, and the auxiliary pin 32A are fixed to the body 13 in a state where the tapered portion 41 and a part of a distal end side of the columnar portion 39 project from the first coupling surface 20 (FIG. 2A).

Figure 4:
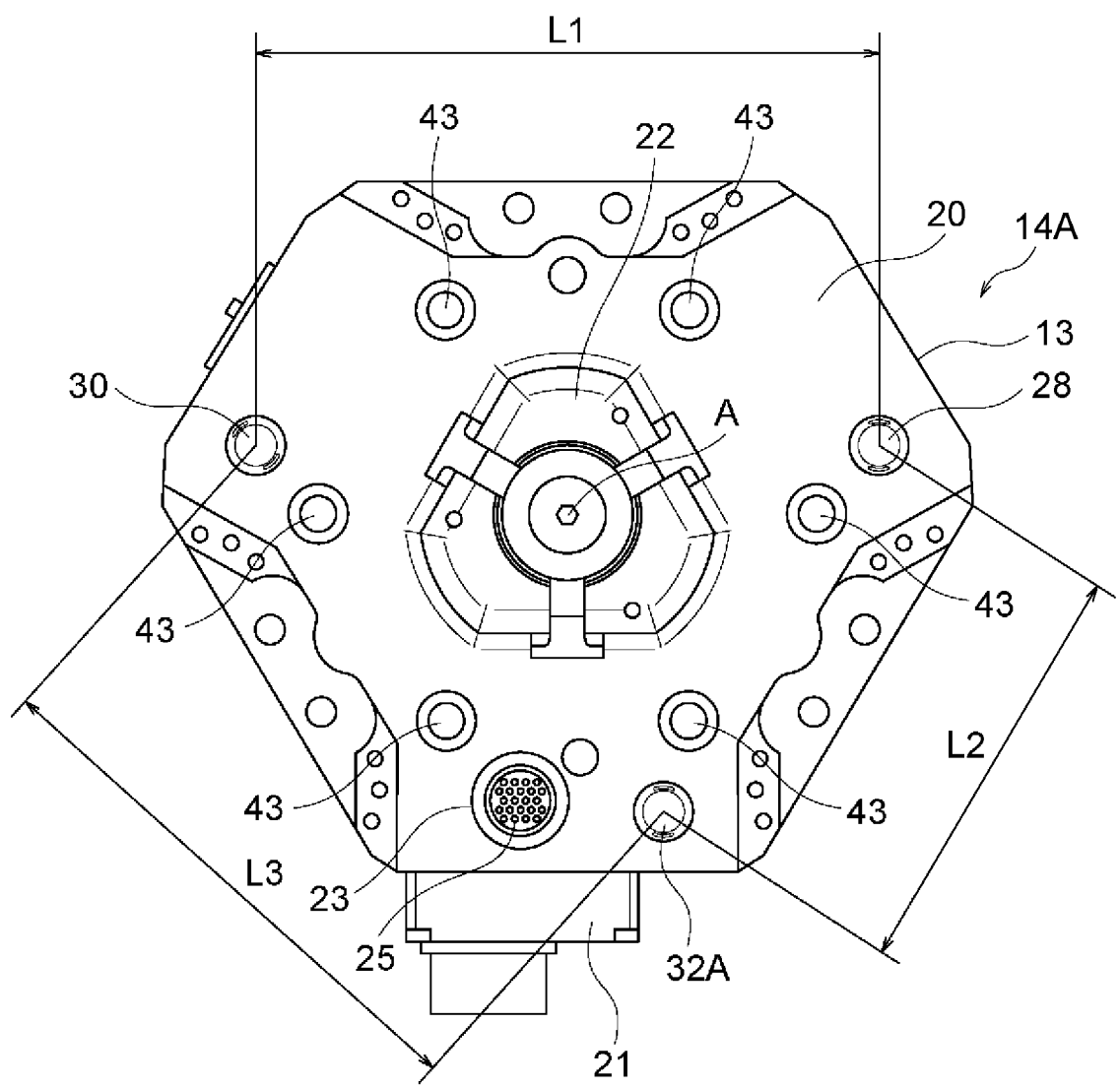
FIG. 4 A front view illustrating the first coupling member according to the first embodiment.

As illustrated in FIG. 4, the first pin 28, the second pin 30, and the auxiliary pin 32A are disposed at positions corresponding to vertices of a triangle on the first coupling surface 20 when viewed from the axis A direction. The first pin 28 and the second pin 30 are arranged so that a distance L1 between the first pin 28 and the second pin 30 is the maximum distance that can be taken on the first coupling member 14A.

The first coupling surface 20 is provided with a projection portion 22, a through hole 43, and a first connector 23. The first pin 28 and the second pin 30 are arranged on the first coupling surface 20 so that the distance L1 is maximized within a range not interfering with the projection portion 22, the through hole 43, and the first connector 23. The distance L1 between the first pin 28 and the second pin 30 is longer than a distance L2 between the auxiliary pin 32A and the first pin 28, and is longer than a distance L3 between the auxiliary pin 32A and the second pin 30. Either the distance L2 or the distance L3 may be longer. FIG. 4 illustrates a case where the distance L3 is longer than the distance L2. The first pin 28, the second pin 30, and the auxiliary pin 32A are provided at positions that are not line-symmetric with respect to a straight line that passes through the center of the first coupling surface 20 and is parallel to the first coupling surface 20, that is, a straight line orthogonal to the axis A.

Figure 2B:
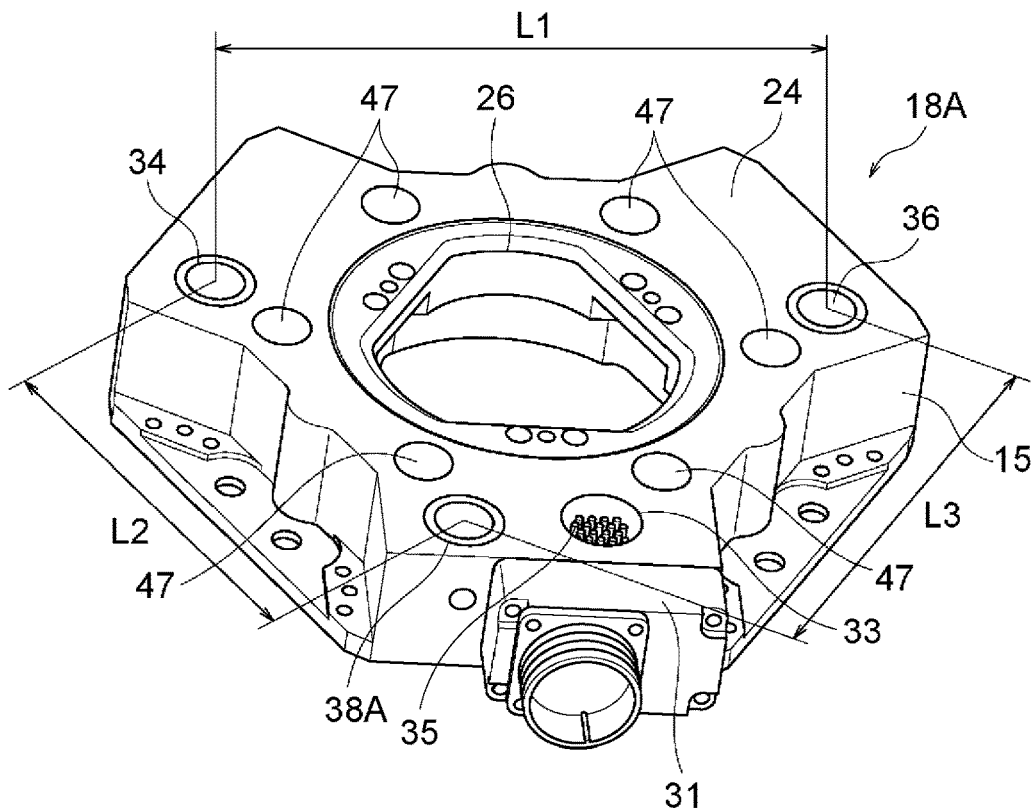
FIG. 2B A perspective view illustrating a second coupling member of the tool exchange device according to the first embodiment.

FIG. 2B is a perspective view illustrating the second coupling member 18A. The second coupling member 18A has a coupling hole 26 penetrating from the second coupling surface 24 to the second fixing surface 19 at a center of the body 15. The coupling hole 26 allows the projection portion 22 to enter and exit, and is provided on its inner surface with an engaging member with which the cam of the engaging mechanism engages. The second coupling surface 24 around the coupling hole 26 is provided with a first hole 34 that allows the first pin 28 to enter and exit, a second hole 36 that allows the second pin 30 to enter and exit, and an auxiliary hole 38A that allows the auxiliary pin 32A to enter and exit.

The first hole 34, the second hole 36, and the auxiliary hole 38A are provided at positions corresponding to the first pin 28, the second pin 30, and the auxiliary pin 32A, respectively. That is, the first hole 34, the second hole 36, and the auxiliary hole 38A are arranged at positions that become vertices of a triangle on the second coupling surface 24 when viewed from the axis A direction.

The second coupling member 18A is provided with a plurality of (six in the case of FIG. 2B) through holes 47 into which bolts (not illustrated) for fixing to the tool 16 are inserted. In the second coupling member 18A, a second signal module 31 is provided on a side surface disposed between the second coupling surface 24 and the second fixing surface 19 of the body 15. The second signal module 31 includes a second connector 33 with terminals 35 exposed on the second coupling surface 24.

The second coupling surface 24 is provided with the coupling hole 26, the through holes 47, and the second connector 33. The first hole 34, the second hole 36, and the auxiliary hole 38A are arranged so as not to interfere with the coupling hole 26, the through holes 47, and the second connector 33 provided in the second coupling surface 24. The distance L1 between the first hole 34 and the second hole 36 is longer than the distance L2 between the auxiliary hole 38A and the first hole 34, and is longer than the distance L3 between the auxiliary hole 38A and the second hole 36. The first hole 34, the second hole 36, and the auxiliary hole 38A are arranged at positions that are not line-symmetric with respect to a straight line orthogonal to the axis A.

Figure 5A:
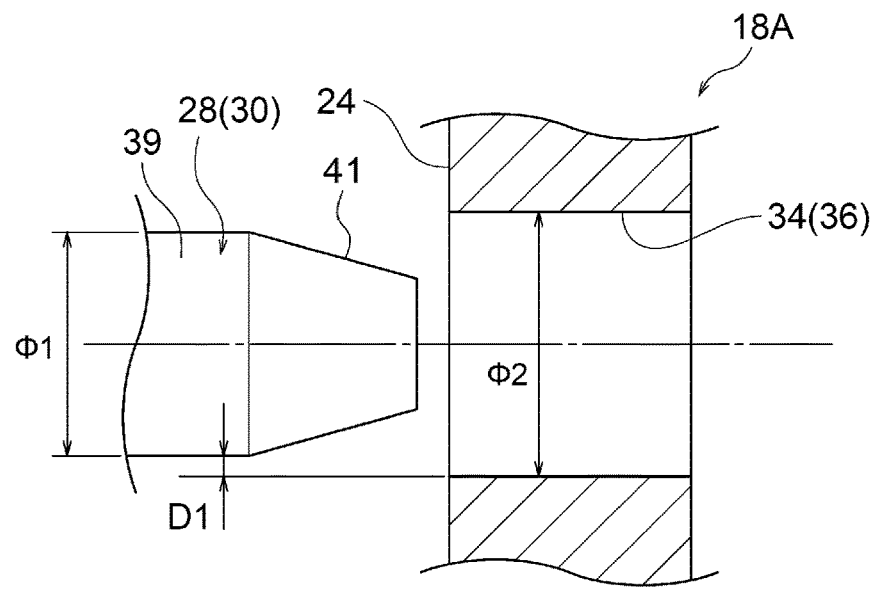
FIG. 5A A partial cross-sectional view schematically illustrating a relationship between the first pin (second pin) and a first hole (second hole).

As illustrated in FIG. 5A, a first gap D1 in a direction parallel to the second coupling surface 24 is provided each between the first pin 28 and the first hole 34 and between the second pin 30 and the second hole 36. The first gap D1 is represented by $(\Phi 2-\Phi 1)/2$ where $\Phi 1$ is the diameter of each of the columnar portions 39 of the first pin 28 and the second pin 30, and $\Phi 2$ is a diameter of each of the first hole 34 and the second hole 36.

Figure 5B:
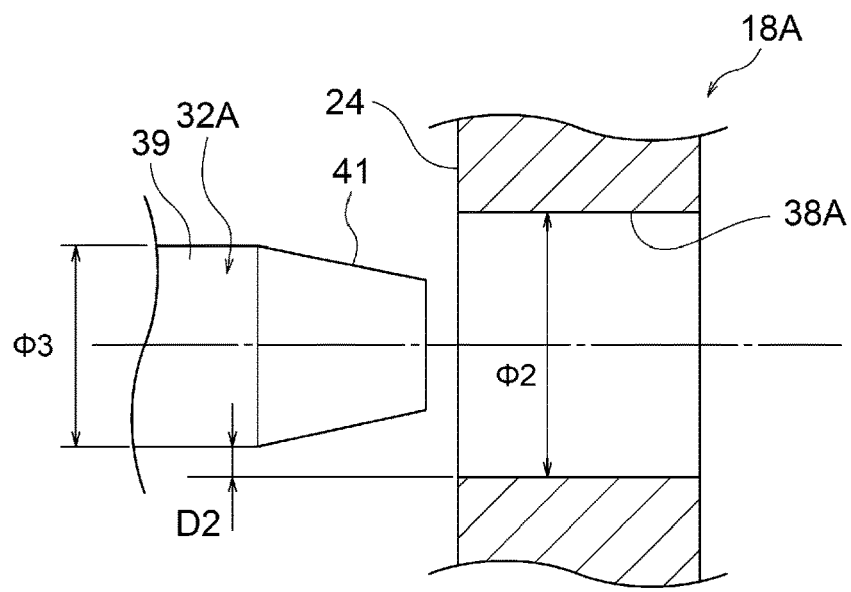
FIG. 5B A partial cross-sectional view schematically illustrating a relationship between the auxiliary pin and an auxiliary hole.

As illustrated in FIG. 5B, a second gap D2 in a direction parallel to the second coupling surface 24 is provided between the auxiliary pin 32A and the auxiliary hole 38A. The second gap D2 is represented by $(\Phi 2-\Phi 3)/2$ where $\Phi 3$ is the diameter of the columnar portion 39 of the auxiliary pin 32A and $\Phi 2$ is a diameter of the auxiliary hole 38A.

The first gap D1 and the second gap D2 in the actual tool exchange device 10 are affected by the distance L1, the distance L2, and the distance L3 in addition to differences between the diameters of shafts and holes. In the present specification, for convenience of description, it is assumed that there are no errors in the distance L1, the distance L2, and the distance L3 between the first coupling member 14A and the second coupling member 18A.

In the case of the present embodiment, since the diameter $\Phi 3$ of the columnar portion 39 of the auxiliary pin 32A is formed to be smaller than the diameters $\Phi 1$ of the columnar portions 39 of the first pin 28 and the second pin 30, the second gap D2 is larger than the first gap D1.

Figure 6A:
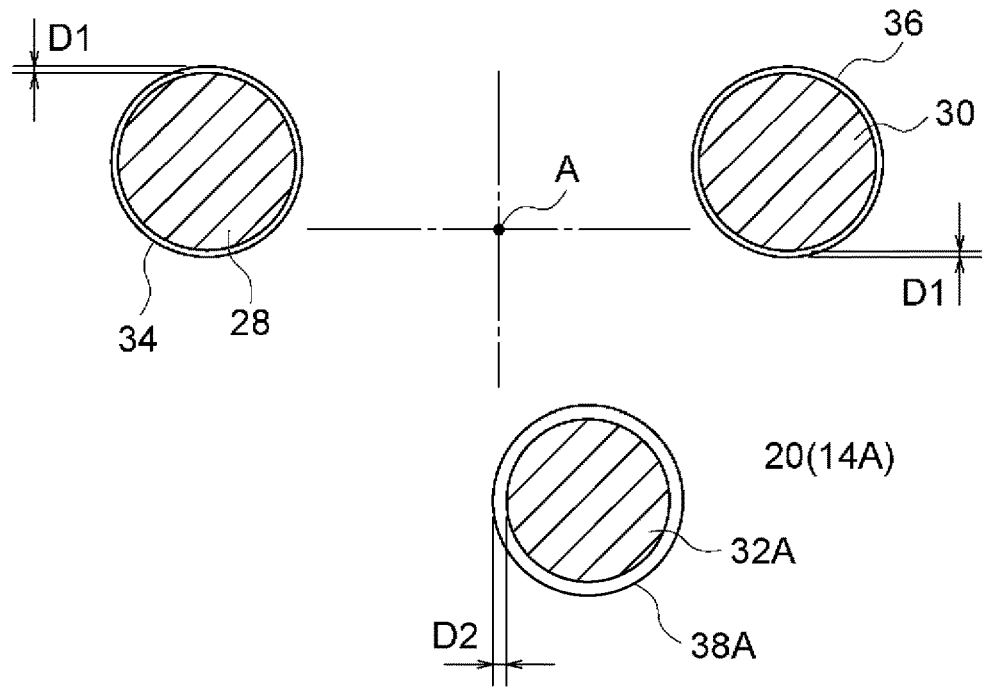
FIG. 6A A schematic view illustrating a positional relationship between the first pin and the first hole, between the second pin and the second hole, and between the auxiliary pin and the auxiliary hole before the first coupling member rotates with respect to the second coupling member.

FIG. 6A is a schematic view illustrating, corresponding to FIG. 4, a positional relationship between the first hole 34, the second hole 36, and the auxiliary hole 38A and the first pin 28, the second pin 30, and the auxiliary pin 32A. Since the second gap D2 is larger than the first gap D1, even if the positions of the first coupling member 14A and the second coupling member 18A are shifted in the direction parallel to the first coupling surface 20 by the first gap D1, the auxiliary pin 32A and the auxiliary hole 38A do not interfere with each other. For example, as illustrated in FIG. 6B, when the first coupling member 14A rotates to the right relative to the second coupling member 18A in the paper plane of FIG. 6 about the axis A, the first pin 28 and the first hole 34 come into contact with each other on an upper side of the drawing, and the second pin 30 and the second hole 36 come into contact with each other on a lower side of the drawing.

Figure 6B:
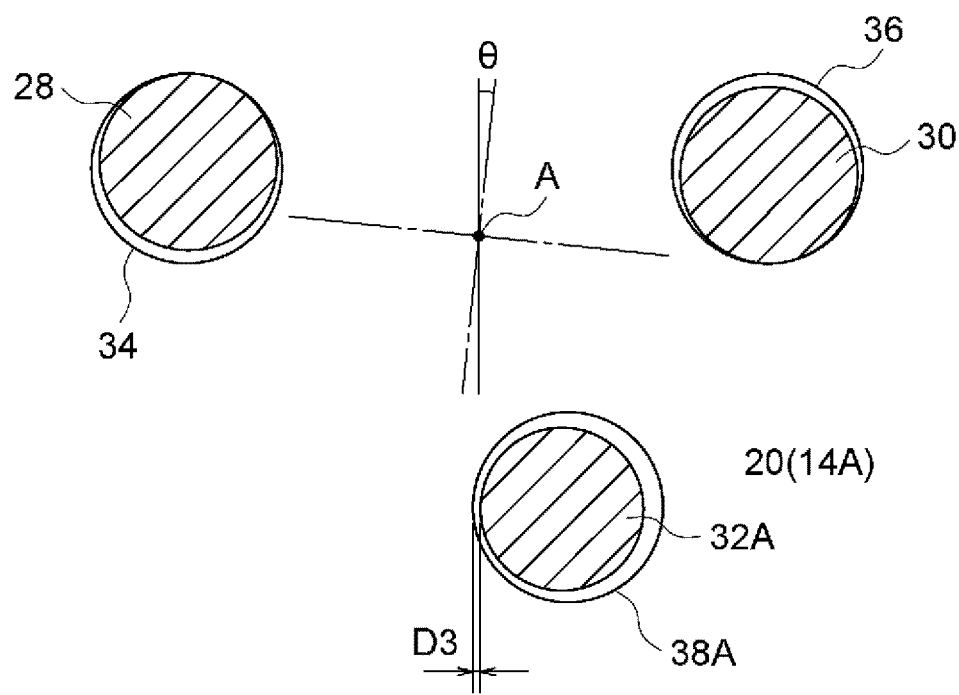
FIG. 6B A schematic view illustrating a positional relationship between the first pin and the first hole, between the second pin and the second hole, and between the auxiliary pin and the auxiliary hole after the first coupling member rotates with respect to the second coupling member.

In a rotational position where the first pin 28 and the first hole 34 are in contact with each other and the second pin 30 and the second hole 36 are in contact with each other, the auxiliary pin 32A and the auxiliary hole 38A come closest to each other on the left side in the paper plane of FIG. 6B. A gap between the auxiliary pin 32A and the auxiliary hole 38A is defined as a third gap D3. That is, the third gap D3 is a minimum gap between the auxiliary pin 32A and the auxiliary hole 38A in the rotational position where the first pin 28 and the first hole 34 are in contact with each other and the second pin 30 and the second hole 36 are in contact with each other. The second gap D2 is of a size that forms at least the third gap D3 between the auxiliary pin 32A and the auxiliary hole 38A at a position where the first pin 28 and the first hole 34 are in contact with each other and the second pin 30 and the second hole 36 are in contact with each other. A displacement of a central angle of the first coupling member 14A with respect to the second coupling member 18A before and after occurrence of a positional deviation in the rotation direction will be referred to as a relative displacement angle θ (FIG. 6B).

When torsional torque is further applied to the first coupling member 14A and the second coupling member 18A about the axis A in a direction relatively rotating to the right from the state illustrated in FIG. 6B, and the first coupling member 14A and the second coupling member 18A are elastically deformed, the auxiliary pin 32A and the auxiliary hole 38A come into contact with each other. In order to suppress the elastic deformation of the first coupling member 14A and the second coupling member 18A by the auxiliary pin 32A, the tool exchange device 10 is preferably formed so that the auxiliary pin 32A and the auxiliary hole 38A come into contact with each other immediately after the start of the elastic deformation. Therefore, the third gap D3 is preferably larger than zero and as small as possible.

(Operation and Effect)

Next, operation and effect of the above configuration will be described. First, teaching is performed to create a program of the industrial robot 1. The arm 12 is moved with respect to the second coupling member 18A fastened to the tool 16 installed on the mounting table, which is not illustrated, to align the first coupling member 14A. A case where the second coupling member 18A is disposed on the placing table such that the axis A is parallel to the z axis will be described. The arm 12 is moved to dispose the first coupling member 14A above the z axis of the second coupling member 18A. Next, the arm 12 is rotated about an x axis and a y axis, and the posture is adjusted such that the first coupling surface 20 of the first coupling member 14A is parallel to the second coupling surface 24 of the second coupling member 18A.

Next, by moving the arm 12 in the x direction and the y direction and rotating the arm 12 about the z axis, the positions of the first pin 28 and the first hole 34 and the second pin 30 and the second hole 36 are aligned. The positions of the first pin 28 and the first hole 34 and the positions of the second pin 30 and the second hole 36 are allowed to be positionally deviated by the amount of the first gap D1.

In the case of the present embodiment, since the second gap D2 between the auxiliary pin 32A and the auxiliary hole 38A is larger than the first gap D1, if the positional deviations between the first pin 28 and the first hole 34 and between the second pin 30 and the second hole 36 are within the range of the first gap D1, the auxiliary pin 32A and the auxiliary hole 38A are naturally disposed at positions not interfering with each other. Therefore, although the auxiliary pin 32A is provided in the first coupling member 14A, alignment can be performed similarly to that in the case where the auxiliary pin 32A is not provided in the tool exchange device 10. That is, in the tool exchange device 10, the positioning difficulty is almost the same as that in the case where the auxiliary pin 32A is not provided.

Next, by moving the arm 12 in the z-axis direction, an operation of coupling and decoupling the first coupling member 14A and the second coupling member 18A is taught. When the tool 16 is coupled to the arm 12, the arm 12 is moved in a direction approaching the second coupling member 18A, and the first pin 28, the second pin 30, and the auxiliary pin 32A are inserted in the first hole 34, the second hole 36, and the auxiliary hole 38A, respectively.

Further, the arm 12 is moved until the first coupling surface 20 and the second coupling surface 24 come into contact with each other, and the engaging mechanism is operated in a state where the projection portion 22 is inserted in the coupling hole 26 to thereby couple the first coupling member 14A and the second coupling member 18A. On the other hand, in order to separate the first coupling member 14A and the second coupling member 18A, after releasing the coupling by the engaging mechanism, the arm 12 is moved in a direction in which the first coupling member 14A is decoupled from the second coupling member 18A. As described above, the tool 16 can be coupled to and decoupled from the arm 12.

Although the tool exchange device 10 includes the auxiliary pin 32A, since the second gap D2 is larger than the first gap D1, the auxiliary pin 32A does not affect an operation of teaching. Therefore, the tool exchange device 10 can suppress a decrease in operability of the teaching.

With the program created by performing the teaching operation as described above, the tool exchange device 10 performs an operation on the basis of the program. That is, the tool exchange device 10 performs a desired operation using the necessary tool 16 by coupling and decoupling the tool 16 to and from the arm 12. By the coupling between the first coupling member 14A and the second coupling member 18A, the first connector 23 and the second connector 33 are brought into an electrical connection state by bringing the terminals 25 and 35 into contact with each other, and by the decoupling between the first coupling member 14A and the second coupling member 18A, the contact of the terminals 25 and 35 with each other is cancelled.

Torsional torque in the rotation direction about the axis A is generated between the first coupling member 14A and the second coupling member 18A according to the operation of the industrial robot, the weight of the tool 16, and the position of the center of gravity of the tool 16. Due to the torsional torque, the first coupling member 14A and the second coupling member 18A relatively rotate by the first gap D1, and the first pin 28 is in contact with the first hole 34 and the second pin 30 is in contact with the second hole 36 (FIG. 6B). Since the second gap D2 is larger than the first gap D1, at the stage when the first pin 28 is in contact with the first hole 34 and the second pin 30 is in contact with the second hole 36, the auxiliary pin 32A and the auxiliary hole 38A are separated by the third gap D3 and are not in contact yet. The torsional torque brings the first pin 28 and the second pin 30 into contact with the first hole 34 and the second hole 36, respectively, to thereby cause stress to act on the first pin 28 and the second pin 30, but since the auxiliary pin 32A is not in contact with the auxiliary hole 38A, stress does not act yet thereto.

When the torsional torque further increases and the force applied between the first pin 28 and the first hole 34 and between the second pin 30 and the second hole 36 increases, the first coupling member 14A and the second coupling member 18A start to elastically deform, and the relative displacement angle θ increases. When the relative displacement angle θ increases, the auxiliary pin 32A and the auxiliary hole 38A eventually come into contact with each other. When the auxiliary pin 32A and the auxiliary hole 38A come into contact with each other, the stress also acts on the auxiliary pin 32A on which the stress due to the torsional torque has not acted so far, thereby improving the torsional torque resistance of the tool exchange device 10. By improving the torsional torque resistance, elastic deformation of the first coupling member 14A and the second coupling member 18A and an increase in the relative displacement angle θ are suppressed. Therefore, the tool exchange device 10 can suppress a positional deviation between the terminals 25 and 35 with each other in the first connector 23 and the second connector 33, and can prevent communication abnormality.

As a result of actually examining the magnitude of the relative displacement angle θ when torsional torque is applied to the first coupling member 14A and the second coupling member 18A, it was confirmed that the relative displacement angle θ becomes smaller by about 40% when the auxiliary pin 32A is provided than when the auxiliary pin 32A is not provided. Therefore, in the tool exchange device 10, the torsional torque resistance can be improved by providing the auxiliary pin 32A.

In the tool exchange device 10, the torsional torque resistance can be improved by including the auxiliary pin 32A, and by making the second gap D2 larger than the first gap D1, the difficulty of alignment can be made similar to the case where the auxiliary pin 32A is not provided.

Since the first pin 28, the second pin 30, and the auxiliary pin 32A are provided at positions that are not line-symmetric with respect to a straight line orthogonal to the axis A, it is possible to prevent the first coupling member 14A and the second coupling member 18A from being coupled to each other by mistaking positions in the rotation direction about the axis A.

The first pin 28 and the second pin 30 are arranged so that the distance L1 is the maximum distance. That is, in the tool exchange device 10, the distance L1 between the first pin 28 and the second pin 30 is longer than that in a case where the first pin 28, the second pin 30, and the auxiliary pin 32A are arranged at equal distances and equal intervals from the axis A. Since the force applied to the first pin 28 and the second pin 30 by the relative rotation of the first coupling member 14A and the second coupling member 18A can be reduced by the longer distance L1, the tool exchange device 10 can further improve the torsional torque resistance.

Since the first pin 28 and the second pin 30 are arranged so that the distance L1 is the maximum distance, the tool exchange device 10 can reduce the relative displacement angle θ generated by the first gap D1 as compared with the case where the distance L1 is short.

Since the first pin 28, the second pin 30, and the auxiliary pin 32A are tapered pins whose diameters decrease toward the distal end, what is called "twisting" in which a shaft comes into contact with a hole and is fixed to the hole in middle of entering and exiting the first hole 34, the second hole 36, and the auxiliary hole 38A can be made less likely to occur as compared with the case of a cylindrical pin.

2. Second Embodiment

Figure 7:
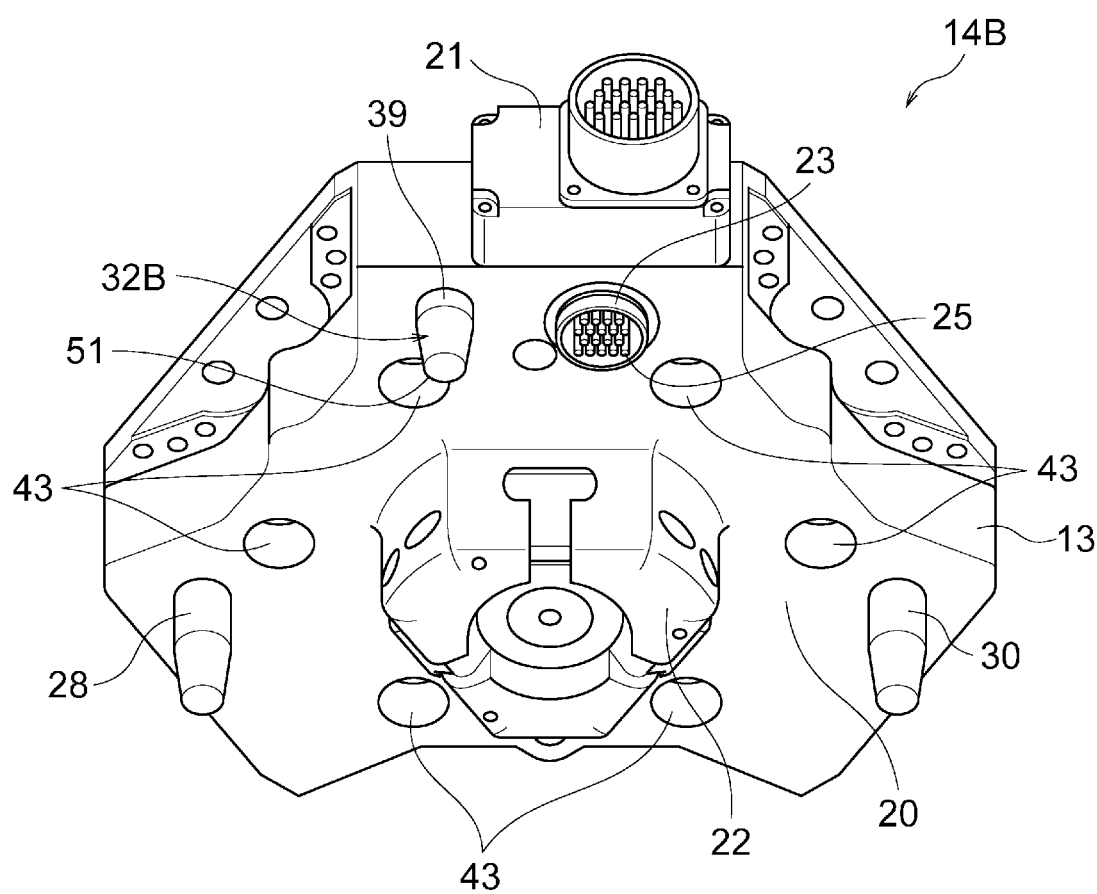
FIG. 7 A perspective view illustrating a first coupling member according to a second embodiment.

A first coupling member according to a second embodiment will be described with reference to FIG. 7. In a first coupling member 14B according to the second embodiment, an auxiliary pin 32B is different from that of the first embodiment. A length from a base end to a distal end of the auxiliary pin 32B according to the second embodiment is shorter than those of the first pin 28 and the second pin 30. In the auxiliary pin 32B illustrated in FIG. 7, the length of the tapered portion 51 is shorter than that of the auxiliary pin 32A of the first embodiment. The auxiliary pin 32B is fixed to the body 13 in a state where the tapered portion 51 and a part of the distal end side of the columnar portion 39 project from the first coupling surface 20. In the first coupling member 14B, the length from the first coupling surface 20 to the distal end of the auxiliary pin 32B is shorter than the length from the first coupling surface 20 to the distal end of the first pin 28 and the length from the first coupling surface 20 to the distal end of the second pin 30.

As in the first embodiment, the diameter Φ3 of the columnar portion 39 of the auxiliary pin 32B is smaller than the diameter Φ1 of the columnar portion 39 of each of the first pin 28 and the second pin 30. In the tool exchange device to which the first coupling member 14B is applied, the second gap D2 is larger than the first gap D1.

The tool exchange device including the first coupling member 14B includes the auxiliary pin 32B, and has the second gap D2 formed between the auxiliary pin 32B and the auxiliary hole 38A, so that similar effects to those of the first embodiment can be obtained. Further, since the length of the auxiliary pin 32B is short, the distal end of the auxiliary pin 32B does not yet reach the auxiliary hole 38A at a stage where the distal ends of the first pin 28 and the second pin 30 start to enter the first hole 34 and the second hole 36. Therefore, since only the first pin 28 and the second pin 30 need to be positioned without being affected by the auxiliary pin 32B at the time of teaching, it is possible to more reliably suppress deterioration in operability of teaching.

Even when it is attempted to insert the first pin 28 and the second pin 30 into the first hole 34 and the second hole 36, respectively, in a state in which the positions of the first pin 28 and the second pin 30 and the first hole 34 and the second hole 36 deviate to exceed the first gap D1, the tool exchange device can more reliably prevent the auxiliary pin 32B and the auxiliary hole 38A from interfering with each other.

3. Modification Example

The present invention is not limited to the above embodiment, and can be appropriately changed within the scope of the gist of the present invention.

Figure 8A:
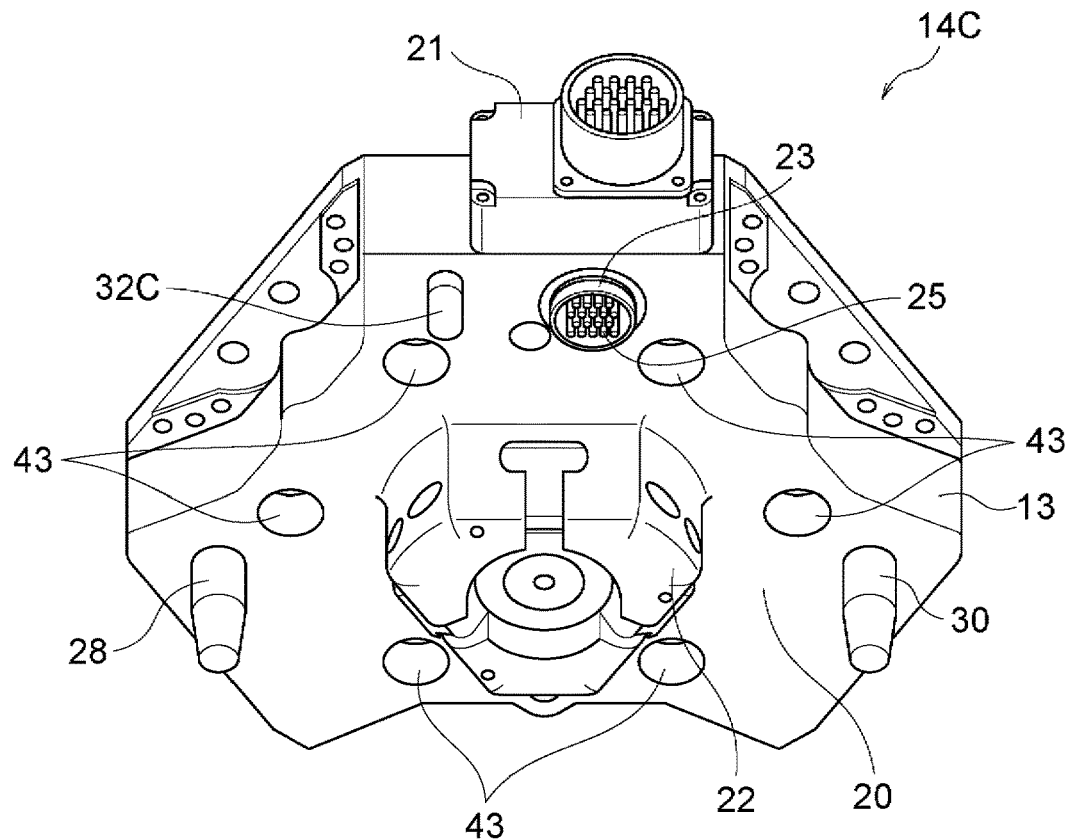
FIG. 8A A perspective view illustrating a first coupling member of a tool exchange device according to a modification example (1).

As in the first coupling member 14C illustrated in FIG. 8A, a parallel key 32C may be used as the auxiliary projection. The parallel key 32C is a columnar member whose distal end surface and base end surface have an oval shape. The distal end surface of the parallel key 32C projects from the first coupling surface 20. Although not illustrated, a female screw is formed on a base end surface of the parallel key 32C. The parallel key 32C is inserted in a hole (not illustrated) provided in the body 13 of the first coupling member 14C from the first coupling surface 20 side, and is fixed by screwing a bolt (not illustrated) from the first fixing surface 17 into the female screw of the base end surface.

Figure 8B:
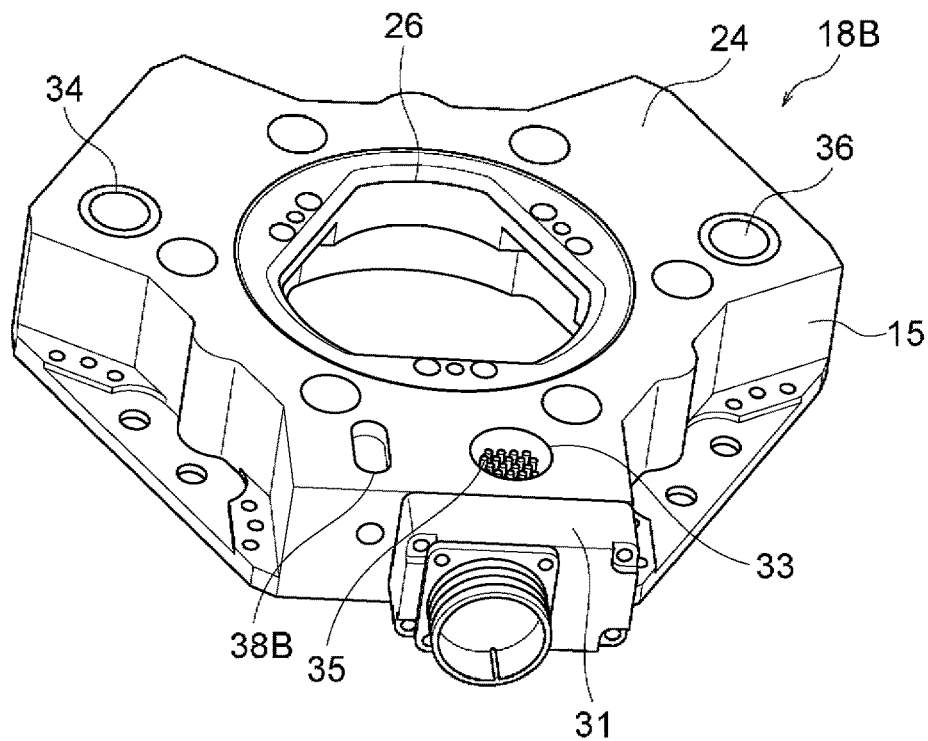
FIG. 8B A perspective view illustrating a second coupling member of the tool exchange device according to the modification example (1).

The length from the first coupling surface 20 to the distal end surface of the parallel key 32C is shorter than the length from the first coupling surface 20 to the distal end of the first pin 28 and the length from the first coupling surface 20 to the distal end of the second pin 30. The second coupling surface 24 of the second coupling member 18B illustrated in FIG. 8B is provided with an auxiliary hole 38B that allows the parallel key 32C to enter and exit. The auxiliary hole 38B has an oval shape corresponding to the parallel key 32C, and has a size that allows forming the second gap D2 in the direction parallel to the second coupling surface 24 with respect to an outer shape of the distal end surface of the parallel key 32C.

The tool exchange device including the first coupling member 14C includes the parallel key 32C, and the second gap D2 is formed between the parallel key 32C and the auxiliary hole 38B, so that similar effects to those of the first embodiment can be obtained. In the first coupling member 14C, since the length from the first coupling surface 20 to the distal end surface of the parallel key 32C is shorter than the length from the first coupling surface 20 to the distal end of the first pin 28 and the length from the first coupling surface 20 to the distal end of the second pin 30, similar effects to those of the second embodiment can be obtained.

Figure 9:
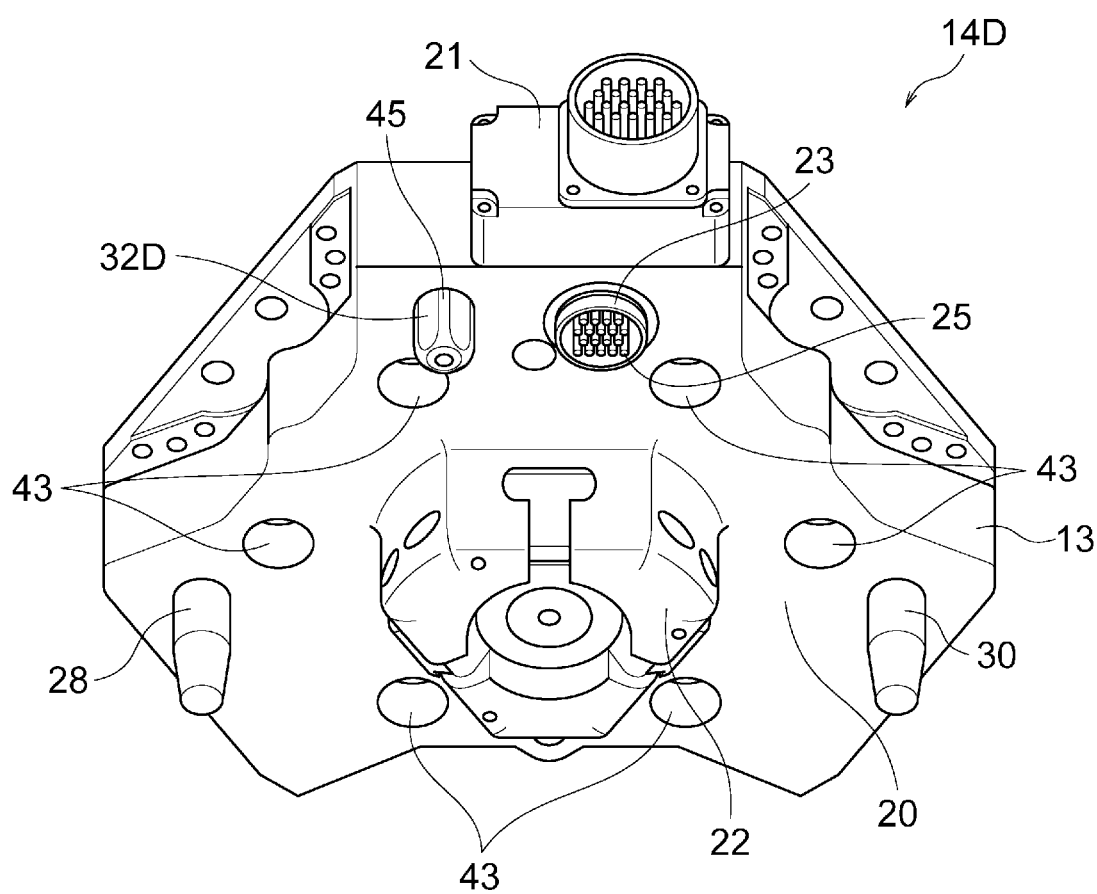
FIG. 9 A perspective view illustrating a first coupling member according to a modification example (2).

As in the first coupling member 14D illustrated in FIG. 9, a diamond pin 32D may be used as the auxiliary projection. The diamond pin 32D includes a columnar portion (not illustrated) and a diamond shape portion 45 integrally provided at a distal end of the columnar portion. The diamond shape portion 45 is formed with a groove extending in the axial direction so as to have a diamond shape as viewed from the central axis. A diameter of the columnar portion and an outermost diameter of the diamond shape portion 45 are the same Φ3. As in the first embodiment, the outermost diameter Φ3 of the diamond shape portion 45 is smaller than the diameter Φ1 of the columnar portion 39 of each of the first pin 28 and the second pin 30.

As the second coupling member, the second coupling member 18A of the first embodiment can be applied. Therefore, the second gap D2 formed between the diamond pin 32D and the auxiliary hole 38A is larger than the first gap D1. The length from the first coupling surface 20 to the distal end of the diamond pin 32D is shorter than the length from the first coupling surface 20 to the distal end of the first pin 28 and the length from the first coupling surface 20 to the distal end of the second pin 30.

The tool exchange device including the first coupling member 14D includes the diamond pin 32D, and the second gap D2 is formed between the diamond pin 32D and the auxiliary hole 38A, so that similar effects to those of the first embodiment can be obtained. In the first coupling member 14D, since the length from the first coupling surface 20 to the distal end of the diamond pin 32D is shorter than the length from the first coupling surface 20 to the distal end of the first pin 28 and the length from the first coupling surface 20 to the distal end of the second pin 30, similar effects to those of the second embodiment can be obtained. Since the diamond pin 32D has a small surface area in contact with the inner surface of the auxiliary hole 38A in the diamond shape portion 45, "twisting" can be made less likely to occur as compared with the case of a cylindrical pin.

In the case of the first embodiment and the second embodiment, the case where the number of auxiliary projections is one has been described, but the present invention is not limited thereto, and the number of auxiliary projections may be two or more.

In the cases of the first embodiment and the second embodiment, the second gap D2 is provided by reducing the diameter of the auxiliary projection, but the present invention is not limited thereto. The second gap D2 may be formed by making the diameter of the auxiliary projection the same as that of the first pin 28 and the second pin 30 and enlarging the auxiliary hole.

In the case of the first embodiment and the second embodiment, the case where the projection portion is provided on the first coupling member and the coupling hole is provided in the second coupling member has been described, but the present invention is not limited thereto, and the coupling hole may be provided in the first coupling member and the projection portion may be provided in the second coupling member.

In the case of the first embodiment and the second embodiment, the case where the first coupling member is fixed to the arm 12 and the second coupling member is fixed to the tool 16 has been described, but the present invention is not limited thereto. The tool exchange device according to the present invention may be applied to an embodiment in which the first coupling member is fixed to the tool 16 and the second coupling member is fixed to the arm 12.

In the case of the first embodiment and the second embodiment, the case where the gap between the first pin 28 and the first hole 34 and the gap between the second pin 30 and the second hole 36 are the first gap D1 has been described, but the gaps of the both are not limited to cases where they completely match each other, and cases where they slightly deviate from each other are included.

In the case of the first embodiment and the second embodiment, the case where the first pin 28 and the second pin 30 are tapered pins has been described, but the present invention is not limited thereto and may be applied to pins having a columnar shape and a polygonal columnar shape.

REFERENCE SIGNS LIST

1: Industrial robot (apparatus)
10: Tool changer
12: Arm (body)
14A, 14B, 14C, 14D: First coupling member
16: Tool
18A, 18B: Second coupling member
20: First coupling surface
24: Second coupling surface
28: First pin
30: Second pin
32A, 32B: Auxiliary pin (auxiliary projection)
32C: Parallel key (auxiliary projection)
32D: Diamond pin (auxiliary projection)
34: First hole
36: Second hole
38A, 38B: Auxiliary hole
A: Axis
D1: First gap
D2: Second gap

The invention claimed is:
1. A tool exchange device comprising:
a first coupling member attached to one of a body side of an apparatus and a tool side and having a first coupling surface; and
a second coupling member attached to the other of the body side and the tool side and having a second coupling surface capable of being in contact with the first coupling surface,
wherein the first coupling member includes, on the first coupling surface,
a first pin,
a second pin, and
an auxiliary projection,
the second coupling member includes, on the second coupling surface,
a first hole that allows the first pin to enter and exit,
a second hole that allows the second pin to enter and exit, and
an auxiliary hole that allows the auxiliary projection to enter and exit,
a first gap in a direction parallel to the second coupling surface is provided each between the first pin and the first hole and between the second pin and the second hole, a second gap in a direction parallel to the second coupling surface is provided between the auxiliary projection and the auxiliary hole, and the second gap is larger than the first gap.

2. The tool exchange device according to claim 1, wherein a length from the first coupling surface to a distal end of the auxiliary projection is shorter than a length from the first coupling surface to a distal end of the first pin and a length from the first coupling surface to a distal end of the second pin.

3. The tool exchange device according to claim 1, wherein a distance between the first pin and the second pin is longer than a distance between the auxiliary projection and the first pin, and is longer than a distance between the auxiliary projection and the second pin.

4. The tool exchange device according to claim 1, wherein the first pin, the second pin, and the auxiliary projection are tapered pins having a tapered portion whose diameter decreases toward the distal end.

5. The tool exchange device according to claim 1, wherein the second gap is capable of forming a third gap between the auxiliary projection and the auxiliary hole at a position where the first pin and the first hole are in contact with each other and the second pin and the second hole are in contact with each other, and is of a size that allows the auxiliary projection and the auxiliary hole to come into contact with each other by elastic deformation of the first coupling member and the second coupling member in a rotation direction about an axis intersecting the first coupling surface and the second coupling surface.

6. The tool exchange device according to claim 1, wherein the first pin, the second pin, and the auxiliary projection are provided at positions that are not line-symmetric with respect to a straight line that passes through a center of the first coupling surface and is parallel to the first coupling surface.

\* \* \* \* \*